United States Patent
Takajo et al.

(10) Patent No.: US 10,554,585 B2
(45) Date of Patent: Feb. 4, 2020

(54) COMMUNICATION ROUTE CONTROL SYSTEM AND COMMUNICATION ROUTE CONTROL METHOD

(75) Inventors: Mamoru Takajo, Tokyo (JP); Masanori Takashima, Tokyo (JP)

(73) Assignee: NEC Corporation, Tokyo (JP)

( * ) Notice: Subject to any disclaimer, the term of this patent is extended or adjusted under 35 U.S.C. 154(b) by 39 days.

(21) Appl. No.: 14/122,003

(22) PCT Filed: May 29, 2012

(86) PCT No.: PCT/JP2012/063817
§ 371 (c)(1),
(2), (4) Date: Nov. 25, 2013

(87) PCT Pub. No.: WO2012/165446
PCT Pub. Date: Dec. 6, 2012

(65) Prior Publication Data
US 2014/0133492 A1   May 15, 2014

(30) Foreign Application Priority Data
May 30, 2011 (JP) ................. 2011-120115

(51) Int. Cl.
*H04L 12/947* (2013.01)

(52) U.S. Cl.
CPC .................. *H04L 49/25* (2013.01)

(58) Field of Classification Search
CPC ... H04L 45/22; H04L 45/28; H04L 2012/562; H04L 45/38; H04L 45/54; H04L 43/106
See application file for complete search history.

(56) References Cited

U.S. PATENT DOCUMENTS 8,159,935 B1 *  4/2012  Fritz ............... H04L 41/0663
                                              370/220
8,457,121 B1 *  6/2013  Sharma et al. ............ 370/389
(Continued)

FOREIGN PATENT DOCUMENTS

JP    2006-352544    12/2006
JP    2008-227558     9/2008

OTHER PUBLICATIONS

McKeown et al., Open flow Enabling innovation in campus networks, Mar. 14, 2008, pp. 6.*
(Continued)

*Primary Examiner* — Romani Ohri
(74) *Attorney, Agent, or Firm* — Finnegan, Henderson, Farabow, Garrett & Dunner, L.L.P.

(57) ABSTRACT

On the OpenFlow network/normal network boundary, the route cannot be appropriately changed under a communication trouble with the controller. In this invention, the controller makes the route formed by internal switches optimal by updating the Flow table of each internal switch. Among internal switches, the internal switch A forms the optimal route with an external switch to become an active internal switch. The internal switch B forms a redundant route with the external switch to become a standby internal switch. When inability of the connection between the controller and the internal switch A is detected, the internal switch A performs a link-down of the port for connecting to the external switch. When the link-down of the port connecting to the internal switch A is detected, the external switch changes the route so that the traffic to the active internal switch A is transferred to the standby switch B.

18 Claims, 6 Drawing Sheets

(56) References Cited

U.S. PATENT DOCUMENTS

| | | | |
|---|---|---|---|
| 2003/0117949 A1* | 6/2003 | Moller et al. | 370/219 |
| 2005/0122899 A1* | 6/2005 | DeBoer et al. | 370/222 |
| 2005/0286413 A1* | 12/2005 | Wakumoto | H04L 41/0663 370/216 |
| 2011/0286324 A1* | 11/2011 | Bellagamba et al. | 370/219 |
| 2012/0155467 A1* | 6/2012 | Appenzeller | H04L 45/54 370/392 |

OTHER PUBLICATIONS

Korean Office Action dated Feb. 27, 2015 by the Korean Patent Office in counterpart Korean Patent Application 10-2013-7031775.
"OpenFlow Switch Specification, Version 1.0.0 Implemented" pp. 1-56, Feb. 2011.
Extended European Search Report dated Oct. 17, 2014 issued by the European Patent Office in European Patent Application No. 12792780.4.
"OpenFlow Switch Specification, Version 1.0.0", [online], Dec. 31, 2009, (URL:http://www.openflowswitch.org/documents/openflow-spec-v1.0.0.pdf ), pp. 1-42.
Nao Tamura, "Korede Nattoku News no Uragawa 1 Datsu Layer de Network o Jizai ni Sekkei Seihinka sareta "Open Flow" no Jitsuryoku", Nikkei Network, Apr. 28, 2011, No. 133, p. 12-13.
International Search Report of the Japanese Patent Office (translation) and Written Opinion of ISA dated Aug. 21, 2012.
English translation of the International Preliminary Report on Patentability dated Dec. 2, 2013 and Written Opinion of the International Searching Authority dated Aug. 21, 2012 in corresponding PCT Application No. PCT/JP2012/063817.
W. Xingjun et al., "Research and Implementation of Model and Pivotal Technology for OpenFlow Switch", Chinese Master's Thesis Full-text Database (Information Technology Series), Nov. 2008.
A. Bianco et al., "OpenFlow Switching: Data Plane Performance", IEEE ICC 2010 proceedings, 2010.
Chinese Office Action dated Jul. 20, 2015 by the Chinese Patent Office in counterpart Chinese Patent Application 201280026777.4.

* cited by examiner

COMMUNICATION ROUTE CONTROL SYSTEM AND COMMUNICATION ROUTE CONTROL METHOD

CROSS-REFERENCE TO RELATED PATENT APPLICATIONS

This application is a National Stage Entry of International Application No. PCT/JP2012/063817, filed May 29, 2012, which claims priority from Japanese Patent Application No. 2011-120115, filed May 30, 2011. The entire contents of the above-referenced applications are expressly incorporated herein by reference.

TECHNICAL FIELD

The present invention relates to a communication route control system, and more particularly, relates to a communication route control system for controlling a communication route of a switch node.

BACKGROUND ART

In conventional network apparatuses, there is a problem that a flexible control such as a load distribution, a slant and the like could not be performed from the outside. For this reason, when the scale of a network becomes large, there are the problems that it becomes difficult to recognize and improve behaviors as a system and that an enormous cost is required for design and configuration change.

As a technique for solving such problems, a means of separating the packet transfer function and the route control function of the network apparatuses from each other has been considered. For example, by dividing the packet transfer function to a network apparatus, and the control function to a control device which is separated to the outside from the network apparatus, the control device can intensively manage the transfer of packets, so that it is possible to construct a network with high flexibility.

[Explanation of CD Separation Type Network]

As one of the intensive management type networks in which the functions are separated, a CD (C: Control Plane/ D: Data Plane) separation type network in which a node device on a data plane side is controlled from the control device on a control plane side is proposed.

As one example of the CD separation type networks, there is the OpenFlow network that uses the OpenFlow technique in which a controller controls switches to perform the route control of the network. The detail of the OpenFlow technique is described in the non-patent literature 1. Note that, the OpenFlow network is merely one example.

[Explanation of the OpenFlow Network]

In the OpenFlow network, an OpenFlow Controller (OFC), which corresponds to the control device, controls the behavior of the OpenFlow Switch (OFS) by operating a Flow table with regard to the route control of an OpenFlow Switch (OFS), which correspond to the node device.

Hereafter, for the simplification of the descriptions, the OpenFlow Controller (OFC) is referred to as the "controller", and the OpenFlow Switch (OFS) is referred to as the "switch".

The controller and the switch are connected to each other through a dedicated line or a control channel (a communication channel for control) referred to as the "Secure Channel" serving as a communication path protected with the SSL (SecureSocketLayer) and the like. The controller and the switch transmits and receives an OpenFlow Message, which is a control message in accordance with (based on) the OpenFlow Protocol, to and from each other, through the control channel.

The switches in the OpenFlow network indicate an edge switch and a core switch, which are arranged in the Open-Flow network and controlled by the controller. In the OpenFlow network, a series of flow of a packet from the reception of the packet at an input side edge switch (Ingress) to the transmission at an output side edge switch (Egress) is referred to as the Flow. In the OpenFlow network, a communication is treated as the flow of end-to-end (E2E: End to End). Then, a route control, a trouble recovery, a load distribution and an optimization are performed by the flow unit.

The packet may be also referred to as the frame. The difference between the packet and the frame is merely the difference in the unit of the data treated in the protocol (PDU: Protocol Data Unit). The packet is the PDU of "TCP/IP" (Transmission Control Protocol/Internet Protocol). On the other hand, the frame is the PDU of "Ethernet (Registered Trademark)".

The Flow table indicates a set of Flow entries. Each Flow entry defines a combination of: a determination condition (rule) to specify the packet which is treated as a flow; statistic information indicating the number of the cases where a packet matches with the rule; and a processing content (action) to be performed to a packet.

The rule of the Flow entry is defined based on various combinations in which some or all of information of respective protocol hierarchies included in the header region (field) of the packet are used and can be discriminated. As an example of the information of the respective protocol hierarchies, a transmission destination address (Destination Address), a transmission source address (Source Address), a transmission destination port (Destination Port), a transmission source port (Source Port) and the like are considered. Further, in the above addresses, the MAC address (Media Access Control Address) and the IP address (Internet Protocol Address) may be included. Also, in addition to the above, the information of an input port (Ingress Port) can also be used for the rule of the Flow entry. Also, as the rule of the Flow entry, it is also possible to set a representation in which a part (or all) of the values of the header region in the packet treated as a flow is represented by using a regular expression, a wild card "*" or the like.

The action of the Flow entry indicates an operation such as "outputting to a specific port", "discarding" or "rewriting of header". For example, if identification information of an output port (the output port number and the like) is represented in the action of the Flow entry, the switch outputs the packet to the port corresponding to the identification information, and discards the packet if the identification information of the output port is not represented. Or, if the header information is represented in the action of the Flow entry, the switch rewrites the header of the packet on the basis of the header information.

The switch performs the action of the Flow entry on the packet group (packet series) that matches with the rule of the Flow entry. Concretely, the switch, when receiving the packet, retrieves the Flow entry, which has the rule matching with the header information of the received packet, from the Flow table. As the result of the retrieval, if the Flow entry which has the rule matching with the header information of the received packet is found, the switch updates the statistic information of the Flow entry and performs the operation, which is specified in the action of the Flow entry, on the received packet. On the other hand, as the result of the retrieval, if a Flow entry which has the rule matching with the header information of the header information is not found, the switch determines that the received packet is the first packet and transfers the received packet (or its copy) to the controller of the OpenFlow network through the control channel and requests the route calculation of the packet on the basis of the transmission source and transmission destination (destination address) of the received packet and the like and then receives the message for setting the Flow entry as a response and consequently updates the Flow table.

Note that, in the Flow table, a default entry which has a rule matching with the header information of all packets is registered at a low priority. If a Flow entry matching with a received packet is not found from other entries, the received packet matches with this default entry. The action of the default entry is "transmission of inquiry information regarding the received packet to the controller".

[Exemplification of Conventional OpenFlow Network]

With reference to FIG. 1, a conventional OpenFlow network is described. Here, a case in which the number of internal switches is 4 is explained as an example.

As shown in FIG. 1, the conventional OpenFlow network includes internal switches 1 to 4, a controller 5, an external switch 6, a terminal 7 and a server 8.

The internal switch means the edge switch and the core switch, which is arranged in the OpenFlow network and controlled by the controller. The external switch means the switch, which is located outside the OpenFlow network (in the network except the OpenFlow network) and is not controlled by the controller.

Each of the internal switches 1 to 4 is connected to the controller 5 through a Secure Channel through which a control message based on the OpenFlow protocol is transmitted and received. The internal switch 1 is connected to the external switch 6. The internal switch 2 is connected to the external switch 6 as a redundant route (a spare route or a detouring route) of the internal switch 1. The internal switch 3 is connected to the internal switch 1 and the server 8 and the like. The internal switch 4 is connected to the internal switch 2 and the server 8 and the like. The controller 5 controls the routes of the internal switches 1 to 4 and sets the optimal route. The external switch 6 is connected to the terminal 7. The terminal 7 communicates with the server 8 through the external switch 6 and the internal switches 1 to 4. Both of the external switch 6 and the terminal 7 correspond to external communication devices that exist outside the OpenFlow network.

[Problem of Conventional OpenFlow Network]

The conventional OpenFlow network has the following problems.

The first problem is as follows. When the communication between the controller and the internal switch 1 becomes impossible, the internal switch 1 continues the communication based on the route information before the communication is cut off. Thus, the actual communication becomes not matched with the control by the controller, so that the communication control becomes impossible.

The second problem is as follows. When the communication between the internal switch 1 and the controller cannot be performed, a new route setting cannot be established in the internal switch and the external switch.

That is, in the CD separation type network such as the OpenFlow network, when a communication trouble between an internal switch and a controller occurs, the controller removes the internal switch, which cannot communicate with the controller, from the target of the route control and then switches to perform a route selection by using a different internal switch. However, an external switch could not detect and cope with the communication trouble.

Namely, for a traffic from the external switch connected to the internal switch at which a trouble occurs, the route control is performed in accordance with the route information prior to the trouble occurrence. Thus, the optimal route control cannot be performed until the communication with the controller recovers. Here, the traffic means digital data (packet) transferring on the network.

CITATION LIST

Non Patent Literature

Non-Patent Literature 1: "OpenFlow Switch Specification, Version 1.0.0", [online], Dec. 31, 2009, [Retrieval on May 16, 2011], Internet (URL: http://www.openflowswitch.org/documents/openflow-spec-v1.0.0.pdf)

SUMMARY OF THE INVENTION

An object of the present invention is to provide a communication route control system which enables the switching to a redundant route from outside by performing a link-down of a port (VLAN port, physical port, and the like) used for the connection with an external communication device existing outside a CD separation type network at the internal switch arranged in the CD separation type network, when a trouble occurs in the communication between the internal switch and the controller on the CD separation type network.

According to an aspect of the present invention, a communication route control system includes: a plurality of switches arranged in a network; a controller configured to perform a route control for each of the plurality of switches; and an external communication device existing outside the network and configured to connect to an active switch among the plurality of switches. The active switch is configured to perform a link-down of a port used for a connection with the external communication device when a communication timeout with the controller is detected. The controller is configured to disconnect the active switch from the network, and perform a route control to switch to a route passing through a standby switch among the plurality of switches when a communication timeout with the active switch is detected. The external communication device is configured to send a traffic which has been sent to the active switch before to either one of the standby switch or a switch existing outside the network when a link-down of a port used to a connection with the active switch is detected.

According to an aspect of the present invention, in a communication route control method, a controller performs a route control for each of a plurality of switches. An external communication device existing outside the network connects to an active switch among the plurality of switches. The active switch performs a link-down of a port used for a connection with the external communication device when a communication timeout with the controller is detected. The controller disconnects the active switch from the network, and performs a route control to switch to a route passing through a standby switch among the plurality of switches when a communication timeout with the active switch is detected, the external communication device sends a traffic which has been sent to the active switch before to either one of the standby switch or a switch existing outside the network when a link-down of a port used to a connection with the active switch is detected.

In an aspect of the present invention, a program makes a computer (which may be a switch, a server and the like) used as the above switch, controller, or external communication device perform a processing of the above communication route control method. In addition, the program according to the present invention can be stored in a storage device or a storage medium.

In the above, a current route can be switched to a redundant route for both of an internal switch and an external communication device, when a trouble occurs in the communication between the internal switch and the controller.

DESCRIPTION OF EXEMPLARY EMBODIMENTS

A target of the present invention is the CD separation type network. Here, the OpenFlow network, that is one of the CD separation type networks, is described as an example. However, actually, the present invention is not limited to the OpenFlow network.

First Exemplary Embodiment

A first exemplary embodiment of the present invention will be described below with reference to the accompanying drawings.

[System Configuration]

Figure 2:
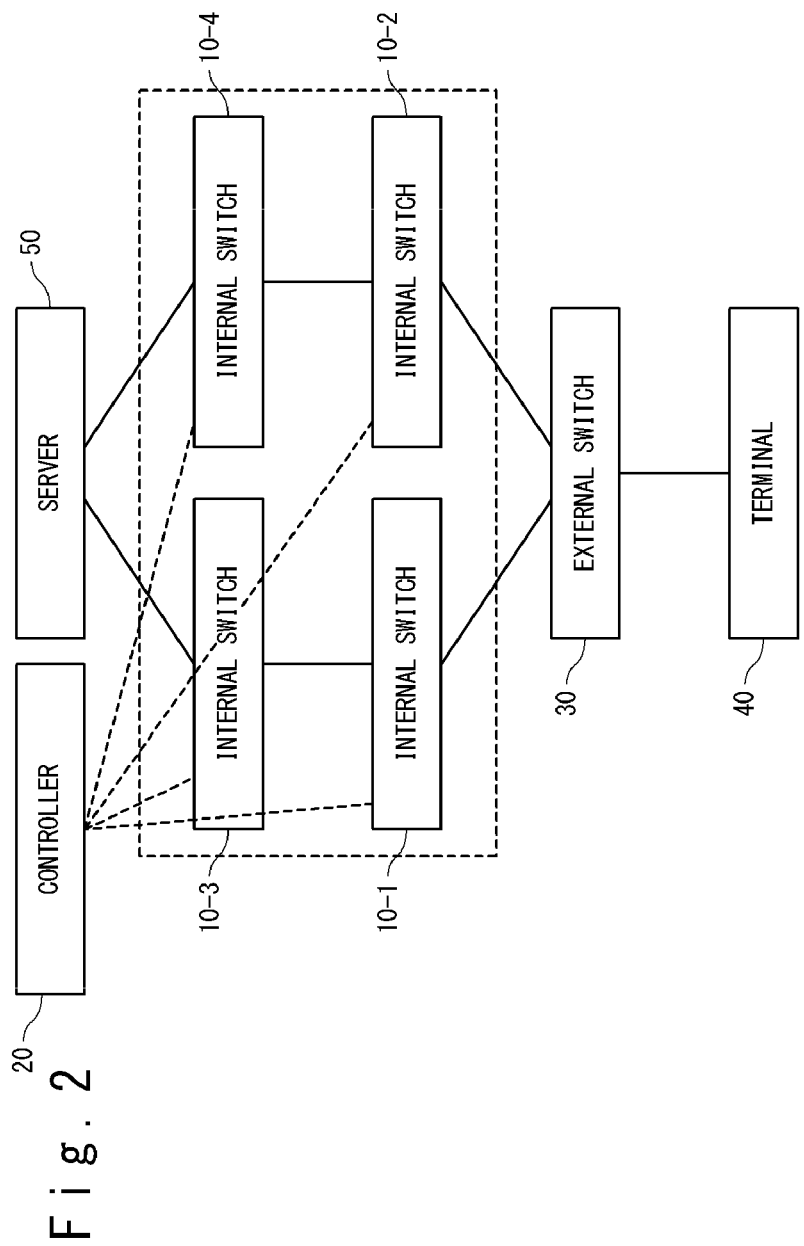
FIG. 2 is a view for explaining a configuration example of a communication route control system according to a first exemplary embodiment of the present invention.

As shown in FIG. 2, the communication route control system according to the first exemplary embodiment of the present invention includes internal switches 10 (10-$i$, i=1 to n: n is an arbitrary number), a controller 20, an external switch 30, a terminal 40 and a server 50.

The internal switches 10 (10-$i$, i=1 to n) are edge switches or core switches that are arranged in the OpenFlow network.

Figure 1:
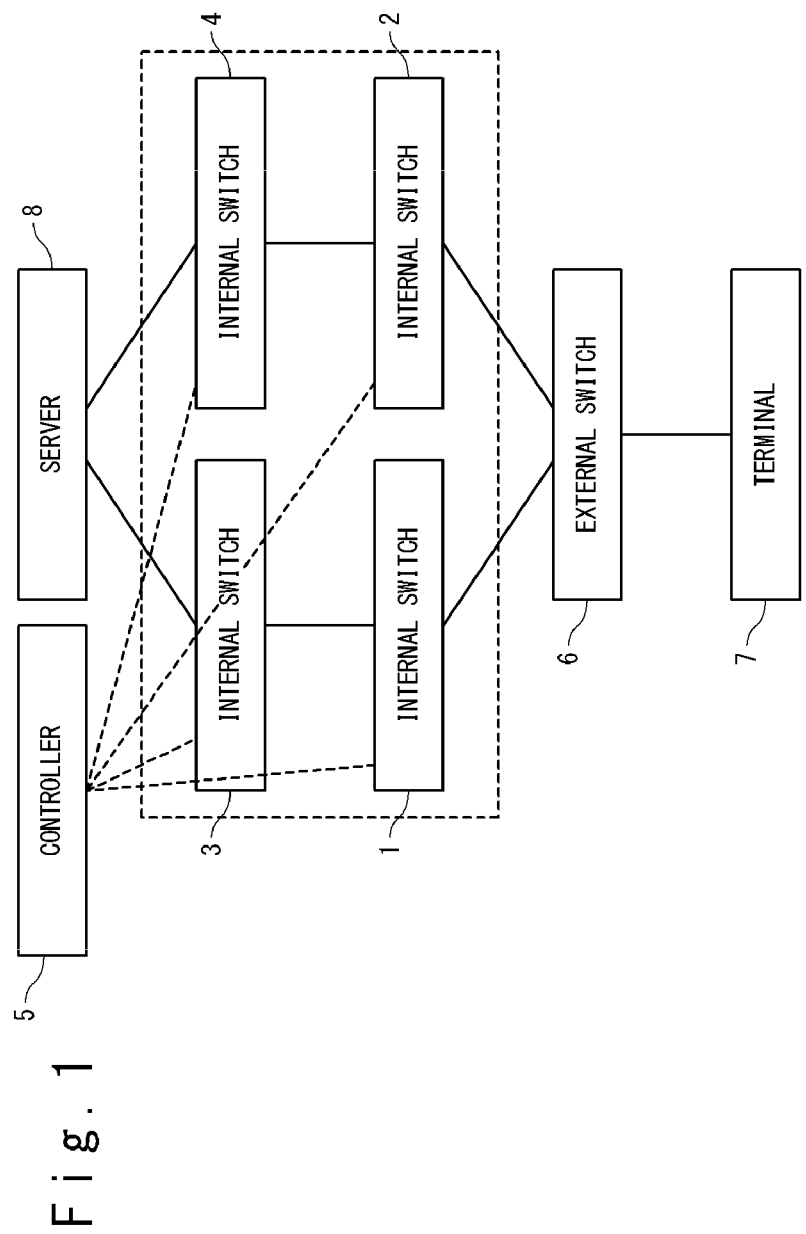
FIG. 1 is a view for explaining a configuration example of a conventional OpenFlow network.

Here, a case in which the number of the internal switches 10 (10-$i$, i=1 to n) is 4 is explained as an example. Each of the internal switches 10-1 to 10-4 is connected to the controller 20 via a Secure Channel through which a control message based on the OpenFlow protocol is transmitted and received. The internal switch 10-1 is connected to the external switch 30. The internal switch 10-2 is connected to the external switch 30 as a redundant route of the internal switch 10-1. That is, the internal switch 10-1 is an active system (a main system, a real system), and the internal switch 10-2 acts as a standby system (a sub group, a spare group). The internal switch 10-3 is connected to the internal switch 10-1 and the server 50 and the like. The internal switch 10-4 is connected to the internal switch 10-2 and the server 50 and the like. However, actually, each of the internal switches 10-1 to 10-4 may be connected to each other. The connections, which are shown in FIG. 1 by solid lines, merely indicate examples of optimal routes and redundant routes.

The controller 20 controls the routes of the internal switches 10-1 to 10-4 and sets the optimal route.

The external switch 30 is a switch existing outside the OpenFlow network. The external switch 30 is connected to the terminal 40.

The terminal 40 performs a communication with the server 50 via the external switch 30 and the internal switches 10-1 to 10-4.

Both of the external switch 30 and the terminal 40 correspond to the external communication devices that exist outside the OpenFlow network.

Here, the external switch 30 is connected to the internal switch 10-1 and the internal switch 10-2 by using a link aggregation and the like and forms a redundant route. Here, the link aggregation indicates a technique that virtually treats a plurality of lines as one line and consequently improves the communication speed and fault tolerant properties.

Further, the controller 20 cannot directly control the route of the external switch 30.

[Operation at Time of Trouble Occurrence]

Figure 3:
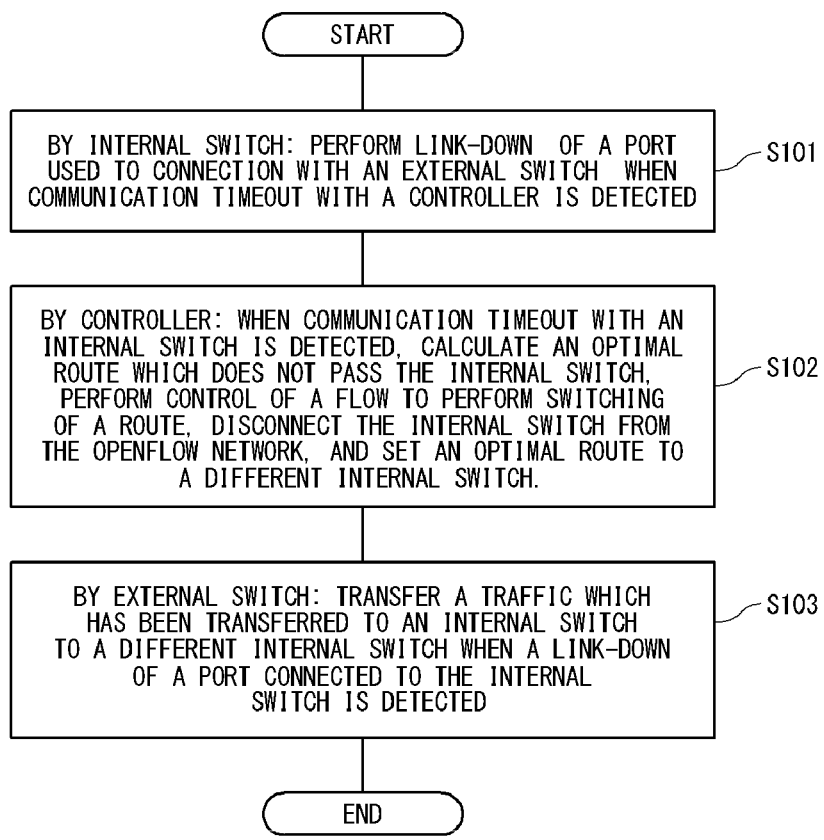
FIG. 3 is a view for explaining an operation of the communication route control system according to the first exemplary embodiment of the present invention.

The operation at the time of trouble occurrence in the internal switch 10-1 will be described below with reference to FIG. 3.

(1) Step S101

The internal switch 10-1, when detecting a communication timeout with the controller 20, performs the link-down of the port (a VLAN port, a physical port and the like) that is used for the connection to the external switch 30. Also, the internal switch 10-1 may be configured to perform the link-down of the port that is used for the connection between the internal switches, similarly to the port that is used for the connection to the external switch 30.

The communication timeout indicates cutting off and stopping the data transfer or the like when it takes too much long time. The link-down indicates a state in which a communication cannot be performed in the data link layer which is the second layer of the communication. That is, the execution of the link-down indicates the state in which with an electronic/physical port closure performed by a hardware control/software control, or the stop of the signal output from the port, or the like, the link is cut off so that the communication becomes impossible.

(2) Step S102

The controller 20, when detecting the communication timeout with the internal switch 10-1, calculates the optimal route, which does not pass through the internal switch 10-1, and updates the Flow table to perform the switching of the route and then separates the internal switch 10-1 from the OpenFlow network and further sets the optimal routes, which do not pass through the internal switch 10-1, for the internal switches 10-2 to 10-4.

The updating operation of the Flow table indicates that the new registration/change/deletion or the like of a Flow entry is performed on the Flow table of the internal switches 10 (10-$i$, i=1 to n). The controller 20 transmits a control message to each of the internal switches 10 (10-$i$, i=1 to n)

to update the Flow table and changes the information with regard to the output port and transfer destination of the traffic in each of the internal switches 10 (10-$i$, i=1 to n).

(3) Step S103

The external switch 30 detects the link-down of the port, which is used for the connection to the internal switch 10-1, and switches the route so that the traffic, which has been transferred to the internal switch 10-1 before, is transferred to the internal switch 10-2. Note that, actually, the external switch 30 may switch the route so that the traffic, which has been transferred to the internal switch 10-1 before, is transferred to a switch on a different network. As an example of the switch on the different network, an internal switch arranged on a different OpenFlow network (an internal switch whose route is controlled by a controller different from the controller 20) or a different external switch or the like is considered.

[Detail of Operation of Internal Switch]

The detail of the operation of the internal switch (the step S101 of FIG. 3) is described.

The internal switch 10-1 pre-registers the port on which the link-down is performed in an Emergency table. Here, the internal switch 10-1 pre-registers the port which is used for the connection to the external switch 30, as the port on which the link-down is performed, in the Emergency table. Note that, the internal switch 10-1 may be designed to register the port in the Emergency table in accordance with the control from the controller 20.

The internal switch 10-1, when detecting the communication timeout with the controller 20, determines the trouble occurrence in the controller 20 itself or in the communication line with the controller 20, and refers to the Emergency table, and then checks the presence or absence of the pre-registered port.

If there is a pre-registered port, the internal switch 10-1 performs the link-down of the port. On the contrary, if there is no pre-registered port, the internal switch 10-1 does not perform the link-down of the port.

Note that, actually, if there is a pre-registered port, the internal switch 10-1 may be designed to check whether or not the pre-registered port is a port that is used for the connection to an external switch 30. For example, the internal switch 10-1 checks the pre-registered port and checks whether or not the pre-registered port is being used for the connection to an external switch 30.

In this example, if the pre-registered port is the port that is used for the connection to an external switch 30, the internal switch 10-1 performs the link-down of the port. On the contrary, even if there is a pre-registered port, if the pre-registered port is not the port used for the connection to an external switch 30, the internal switch 10-1 does not perform the link-down of the port.

Moreover, the internal switch 10-1 refers to the Flow table and deletes (clears) the route information (the Flow entry and the like) that indicates the transfer route of the traffic to the external switch 30 or from the external switch 30. For example, the internal switch 10-1 initializes the Flow table.

Note that, the deletion of the route information (the initialization of the Flow table or the like) is preferred to be performed after the completion of the process with regard to the execution of the link-down of the port, in order to avoid the deletion of the route which is currently connected to the external switch 30.

Also, the internal switch 10-1 can perform the link-down of the port that is used for the connections to the internal switch 10-2 to the internal switch 10-4, as necessary. For example, the internal switch 10-1 can perform the link-down of the port that is used for the connections to the internal switch 10-2 to the internal switch 10-4 by pre-registering the port that is used for the connections to the internal switch 10-2 to the internal switch 10-4 as the port on which the link-down is performed in the Emergency table.

In the above example, each of the internal switch 10-2 to the internal switch 10-4 may be designed such that each of them, when detecting the link-down of the port that is used for the connection to the internal switch 10-1, checks the connection status between the own device and the controller 20 and if the connection status between the own device and the controller 20 is normal, sets a new optimal route by requesting the route control to the controller 20. If the connection status between the own device and the controller 20 is not normal, as a result, since each of the internal switch 10-2 to the internal switch 10-4 detects the communication timeout with the controller 20. Thus, the process same to the internal switch 10-1 as mentioned above is performed.

[Detail of Operation of Controller]

The detail of the operation of the controller (the Step S102 in FIG. 3) is described.

The controller 20, when detecting the communication timeout with the internal switch 10-1, determines the trouble occurrence in the internal switch 10-1 itself or in the communication line with the internal switch 10-1, and calculates the optimal route that does not pass through the internal switch 10-1.

The controller 20 updates the Flow table to perform the switching of the route and separates the internal switch 10-1 from the network and then sets the optimal route for the internal switch 10-2 to the internal switch 10-4. At this time, the internal switch 10-2 to the internal switch 10-4 register the Flow entry, which indicates that the traffic is transferred via the optimal route, in the Flow table, in accordance with the setting of the optimal route from the controller 20, and starts transferring the traffic to the optimal route.

[Detail of Operation of External Switch]

The detail of the operation of the external switch (the step S101 in FIG. 3) is described.

The external switch 30, when detecting the link-down of the port that is used for the connection to the internal switch 10-1, switches the route so that the traffic, which has been transferred to the internal switch 10-1 before, is transferred to a different switch (the internal switch 10-2 or a switch on a different network) and then starts transferring the traffic.

For example, the external switch 30 switches the output port of the traffic from the port which is used for the connection to the internal switch 10-1 to the port which is used for the connection to a different switch.

Note that, the external switch 30 may be designed such that the external switch 30, when detecting the link-down of the port which is used for the connection to the internal switch 10-1, retries the connection to the internal switch 10-1. In the case of the link-down processed by the internal switch 10-1 such as at the step S101, the internal switch 10-1 is not subjected to the control from the controller 20, and the Flow table is initialized. However, since it is normally operating, if there is route information of the initial setting (default), the traffic can be transferred on the basis of the route information.

In this case, if the re-connection to the internal switch 10-1 is impossible (for example, there is no response even for the re-connection requests of the predetermined number of times), the external switch 30 switches the route so that the traffic, which has been transferred to the internal switch 10-1 before, is transferred to a different switch, and then starts transferring of the traffic.

[Configuration of Internal Switch]

Figure 4:
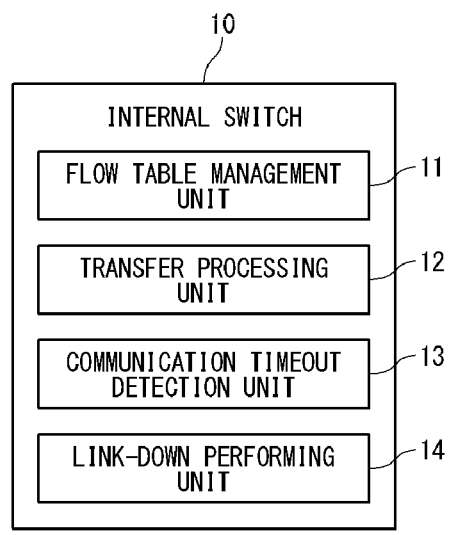
FIG. 4 is a view for explaining a configuration example of an internal switch according to the first exemplary embodiment of the present invention.

The configuration example of the internal switch will be described below with reference to FIG. 4.

Each of the internal switches 10 (10-$i$, $i$=1 to n) contains a Flow table management unit 11, a transfer processing unit 12, a communication timeout detection unit 13, and a link-down performing unit 14.

The Flow table management unit 11 receives a control message based on the OpenFlow protocol through the Secure Channel from the controller 20, and registers the Flow entry in the Flow table of the own device on the basis of the content of the control message.

The transfer processing unit 12 processes a received packet in accordance with the Flow entry registered in the Flow table of the own device.

The communication timeout detection unit 13 monitors the Secure Channel connected to the controller 20 and detects the communication timeout with the controller 20.

If a port that is used for the connection to the external switch 30 exists in the own device, the link-down performing unit 14 performs the link-down of the port that is used for the connection to the external switch 30, when the communication timeout with the controller 20 is detected.

[Configuration of Controller]

Figure 5:
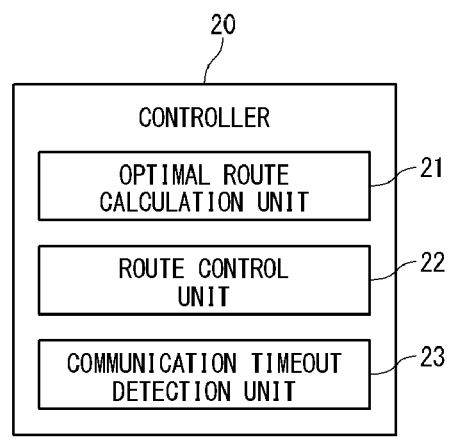
FIG. 5 is a view for explaining a configuration example of a controller according to the first exemplary embodiment of the present invention.

The configuration example of the controller will be described below with reference to FIG. 5.

The controller 20 contains an optimal route calculation unit 21, a route control unit 22 and a communication timeout detection unit 23.

The optimal route calculation unit 21 calculates the optimal route, which passes through some of the internal switches 10 (10-$i$, $i$=1 to n), on the basis of topology information and the like. When the communication timeout with at least one internal switch among the internal switches located on the current route is detected, the optimal route calculation unit 21 calculates the optimal route that passes through a different internal switch without passing through the internal switch in which the communication timeout is detected.

The route control unit 22 transmits a control message based on the OpenFlow protocol via a Secure Channel to the internal switches on the calculated optimal route, among the internal switches 10 (10-$i$, $i$=1 to n) and sets the Flow table. When the communication timeout is detected and the optimal route is calculated, the route control unit 22 changes the setting of the Flow tables of the internal switches 10 (10-$i$, $i$=1 to n) so that the internal switch in which the communication timeout is detected is separated from the OpenFlow network, and sets a different internal switch so that the current route passing through the internal switch in which the communication timeout is detected to an optimal route passing through the different internal switch.

The communication timeout detection unit 23 monitors the Secure Channel connected to each of the internal switches 10 (10-$i$, $i$=1 to n) and detects the communication timeout in each of the internal switches 10 (10-$i$, $i$=1 to n).

[Configuration of External Switch]

Figure 6:
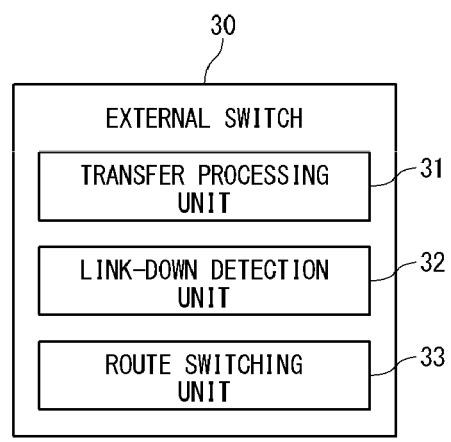
FIG. 6 is a view for explaining a configuration example of an external switch according to the first exemplary embodiment of the present invention.

The configuration example of the external switch will be described below with reference to FIG. 6.

The external switch 30 contains a transfer processing unit 31, a link-down detection unit 32 and a route switching unit 33.

The transfer processing unit 31 transfers a traffic to the internal switch of the connection destination, through the port of the own device connected to one of the internal switches 10 (10-$i$, $i$=1 to n).

The link-down detection unit 32 detects the link-down of the port of the own device connected to one of the internal switches 10 (10-$i$, $i$=1 to n).

The route switching unit 33 switches a route so that among the internal switches 10 (10-$i$, $i$=1 to n), the traffic, which has been transferred to an internal switch in which the communication timeout is detected before, is transferred to a different internal switch. For example, the route switching unit 33 closes and invalidates the port of the own device connected to the internal switch in which the communication timeout is detected, and opens and validates the port of the own device connected to the different internal switch. Or, the route switching unit 33 switches the port for the signal output, from the port of the own device connected to the internal switch in which the communication timeout is detected, to the port of the own device connected to a different switch.

[Effect of this Exemplary Embodiment]

In this exemplary embodiment, since the link from the internal switch to the external switch is made down, the internal switch can be separated from the network.

Also, in this exemplary embodiment, when the communication between the internal switch and the controller becomes impossible, the internal switch that cannot be controlled by the controller is separated from the network. Thus, it is possible to avoid the mismatch between the states of the control plane and the data plane.

Also, in this exemplary embodiment, the link-down of the port is not performed between the internal switch separated from the network and the different internal switch. Thus, it is possible to login the internal switch through the different internal switch and analyze its problem.

Also, in this exemplary embodiment, only the link to the external switch is made down. Thus, even at the time of the trouble occurrence in the controller, a communication can be performed in the inner network.

Second Exemplary Embodiment

The second exemplary embodiment of the present invention will be described below.

As the second exemplary embodiment of the present invention, a case in which an internal switch has a function of a wireless access (wireless connection) is explained.

[System Configuration]

Figure 7:
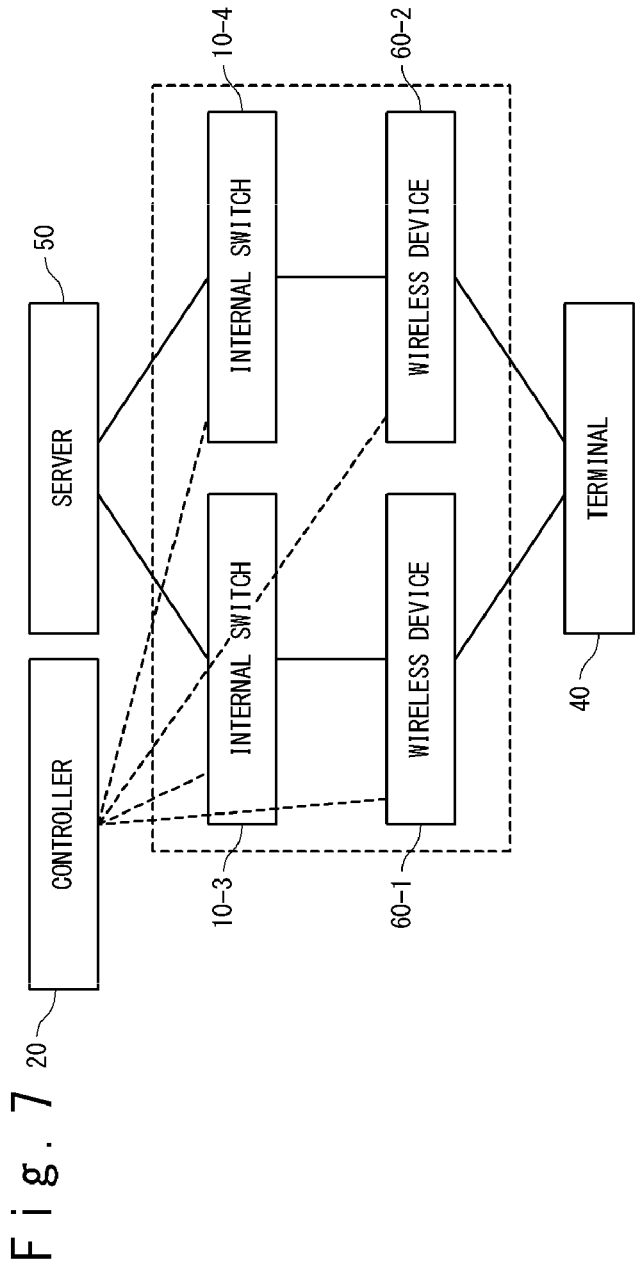
FIG. 7 is a view for explaining a configuration example of a communication route control system according to a second exemplary embodiment of the present invention.

As shown in FIG. 7, the communication route control system according to the second exemplary embodiment of the present invention contains internal switches 10 (10-$i$, $i$=1 to n), a controller 20, a terminal 40, a server 50 and wireless devices 60 (60-$j$, $j$=1 to m: m is an arbitrary number).

The internal switches 10 (10-$i$, $i$=1 to n), the controller 20, the terminal 40 and the server 50 are basically same to those of the first exemplary embodiment shown in FIG. 2.

Each of the wireless devices 60 (60-$j$, $j$=1 to m) is connected to a terminal 40 by wireless access and connected to the internal switches 10 (10-$i$, $i$=1 to n) via any of wire or wireless communication.

Also, each of the wireless devices 60 (60-$j$, $j$=1 to m) is connected to the controller 20 through the Secure Channel, similarly to the internal switches (10-$i$, $i$=1 to n). The wireless device 60-1 is connected to the internal switch 10-3. The wireless device 60-2 is connected to the internal switch 10-4 as the redundant route of the wireless device 60-1.

That is, each of the wireless devices 60 (60-$j$, $j$=1 to m) is same to the internal switches 10 (10-$i$, $i$=1 to n) described in the first exemplary embodiment, except that each of the wireless devices (60-$j$, j=1 to m) is directly connected to the terminal 40 by the wireless access instead of the connection to the external switch 30.

Each of the wireless devices 60 (60-$j$, j=1 to m) corresponds to the edge switches arranged in the OpenFlow network.

[Detail of this Exemplary Embodiment]

The terminal 40 requests a connection to the wireless device 60-1 and connects by wireless access.

The wireless device 60-1 transfers a traffic to one of the internal switches 10 (10-$i$, i=1 to n) which is a connection destination, through the port of the own device connected to the internal switch, in accordance with the route control (the Flow table of the own device) from the controller 20.

When the wireless device 60-1 cannot communicate with the controller 20, the wireless device 60-1 performs the suspension of signal transmission (the stop of transmission of electric wave), for the wireless access to the terminal 40. This "execution of the suspension of the electric wave" corresponds to "the execution of the link-down" in other exemplary embodiments.

The terminal 40 is connected to the wireless device 60-2 by the wireless access, since the connection to the wireless device 60-1 by the wireless access is cut off.

Effect of this Exemplary Embodiment

In this exemplary embodiment, wireless access is linked to the route control of the network. Thus, the wireless access linked to the route control enables the resource including the electric wave resource to be effectively used.

Relation Between Respective Exemplary Embodiments

Note that, the above-mentioned exemplary embodiments can be implemented by combining any of them.

Exemplification of Hardware

In order to attain the network system according to the present invention, specific examples of hardware will be described below.

As examples of the internal switch 10 (10-$i$, i=1 to n), the external switch 30 and the wireless device 60 (60-$j$, j=1 to m), a network switch, a router, a proxy, a gateway, a firewall, a load balancer (load distribution apparatus), a band control device (packet shaper), a security monitoring control device (SCADA: Supervisory Control And Data Acquisition), a gatekeeper, a base station, an access point (AP), a communication satellite (CS), or a calculator that has a plurality of communication ports or the like may be considered.

As examples of the controller 20, the terminal 40 and the server 50, computers such as a PC (personal computer), an appliance, a thin client terminal/server, a workstation, a mainframe, a supercomputer and the like are assumed. As different examples of the terminal 40, an IP telephone, a mobile telephone, a smart phone, a smart book, a car navigation (car navigation system), a portable video game machine, a non-portable game console, a portable music player, a handy terminal, a gadget (electronic apparatus), an interactive television, a digital tuner, a digital recorder, an information home appliance, an OA (office automation) apparatus, a store front terminal, high functional copier, a digital signage (electronic signboard) and the like may be considered. Note that, the controller 20, the terminal 40 and the server 50 may be relay devices or peripheral devices.

Also, each of the internal switch 10 (10-$i$, i=1 to n), the controller 20, the external switch 30, the terminal 40, the server 50 and the wireless device (60-$j$, j=1 to m) may be an expansion board installed in a calculator or the like, or a virtual machine (VM) constructed on a physical machine.

Also, each of the internal switch 10 (10-$i$, i=1 to n), the controller 20, the external switch 30, the terminal 40, the server 50 and the wireless device 60 (60-$j$, j=1 to m) may be installed in a vehicle such as an automobile, a ship, an airplane or the like.

Although not shown in the drawings, each of the internal switch 10 (10-$i$, i=1 to n), the controller 20, the external switch 30, the terminal 40, the server 50 and the wireless device 60 (60-$j$, j=1 to m) is attained by: a processor that is driven on the basis of a program and performs a predetermined process; a memory for storing the program and various data; and an interface that is used for the communication with the network.

As the example of the above processor, a CPU (Central Processing Unit), a network processor (NP), a microprocessor, a microcontroller, or a semiconductor integrated circuit (LSI: Large Scale Integration) that has a dedicated function or the like may be considered.

As examples of the above memory, the semiconductor storage device such as RAM (Random Access Memory), ROM (Random Only Memory), EEPROM (Electrically Erasable and Programmable Read Only Memory), a flash memory or the like, the auxiliary storage device such as HDD (Hard Disk Drive), SSD (Solid State Drive) or the like, the removable disk such as DVD (Digital Versatile Disk) or the like, the storage medium (media) such as SD memory card (Secure Digital memory card) or the like may be considered. Also, a buffer, a register or the like may be used. Or, the storage device that uses DAS (Direct Attached Storage), FC-SAN (Fiber Channel-Storage Area Network), NAS (Network Attached Storage), IP-SAN (IP-Storage Area Network) or the like may be used.

Note that, the above processor and the above memory may be integrated into a single device. For example, in recent years, the one-chip device such as a microcomputer and the like has been progressed. Thus, an example in which one chip microcomputer installed in an electronic apparatus or the like has the above processor and the above memory may be considered.

As an example of the above interface, a substrate (a mother board or an I/O board) which corresponds to a network communication, a semiconductor integrated circuit such as a chip and the like, the network adaptor such as NIC (Network Interface Card) or the like or a similar expansion card, the communication apparatus such as an antenna or the like, the communication port such as a connection port (connector) or the like may be considered.

Also, as an example of the network, the Internet, a LAN (Local Area Network), a wireless LAN, a WAN (Wide Area Network), a backbone, a cable television (CATV) line, a fixed telephone network, a mobile telephone network, WiMAX (IEEE 802.16a), 3G (3rd Generation), a dedicated line (lease line), IrDA (Infrared Data Association), the Bluetooth (registered mark), a serial communication line, a data bus or the like may be considered.

Note that, the inner configuration element in each of the internal switch 10 (10-$i$, i=1 to n), the controller 20, the external switch 30, the terminal 40, the server 50 and the wireless device 60 (60-$j$, j=1 to m) may be a module, a component, or a dedicated device, or a program for starting (calling) them.

However, actually, they are not limited to those examples.

Features of the Present Invention

As explained above, a target of the present invention is the CD separation type network represented by the OpenFlow network. Note that, the OpenFlow network merely indicates one example. Actually, the target of the present invention may be the network in which the route control is performed by means other than "the updating operation of the Flow table that uses the OpenFlow technique".

The present invention is characterized in that it is possible to solve a problem in which on the boundary between the CD separation type network and a usual network, the detouring operation of the route is not correctly switched when the communication trouble is occurred.

In the present invention, the route is detoured by carrying out a port shutdown on the boundary of the CD separation type network.

The controller updates the Flow table for each of the plurality of internal switches, and the route formed by the plurality of internal switches is made optimal.

Among the plurality of internal switches, an internal switch A forms an optimal route with the external switch, and serves as the internal switch of the active system. Among the plurality of internal switches, an internal switch B forms a redundant route with the external switch and serves as the internal switch of the standby system.

When a trouble occurs in the internal switch A, the controller updates the Flow table for each of the plurality of internal switches. Consequently, the route is switched from the route that passes through the internal switch A to the route that passes through the internal switch B.

When the connection between the controller and the internal switch A is disconnected caused by the trouble occurrence in the controller or the like, the internal switch A cannot be controlled by the controller. Thus, the addition/deletion of the route (the switching of the route) cannot be performed by updating the Flow table.

The internal switch A, when detecting that the controller and the internal switch A cannot be connected to each other, performs the link-down of the port connected to the external switch.

The external switch, when detecting the link-down of the port connected to the internal switch A, switches the route and transfers the traffic to the internal switch A in the active system, to the internal switch B in the standby system.

In this way, in the present invention, in an internal switch in which a communication trouble with a controller occurs, the link to a connected external switch is made down. Consequently, since a fact that a normal operation is impossible can be reported to the outside, it is possible to switch to the route that passes through a switch which can be normally operated.

<Supplementary Notes>

A part or all of the above-mentioned exemplary embodiments may be described as the following supplementary notes. However, they are not limited to the examples described below.

(Supplementary Note 1)

A communication route control system including:
a plurality of switches arranged in a network;
a controller for setting a Flow entry, in which a rule and an action to uniformly control packets as a flow are defined, for each of Flow tables in the plurality of switches; and
an external communication device, which is located outside the above network and connected to a switch in an active system among the above plurality of switches, wherein the switch in the active system, when detecting a communication timeout with the controller, performs a link-down of a port which is used for a connection to the external communication device, the above controller, when detecting the communication timeout with the switch in the above active system, performs a route control for separating the switch in the above active system from the above network and switches to a route which passes through a switch in a standby system among the above plurality of switches, and the external communication device, when detecting the link-down of the port which is used for the connection to the switch in the active system, transmits a traffic, which has been transmitted to the switch of the above active system before, to one of the switch in the standby system and the switch existing outside the network.

(Supplementary Note 2)

The communication route control system described in the supplementary note 1, wherein the port on which the link-down is performed is predetermined, and when the communication timeout with the controller is detected, the presence or absence of the predetermined port is checked, and if there is the predetermined port, the link-down of the port is performed.

(Supplementary Note 4)

The communication route control system described in one of the supplementary notes 1 to 3, wherein, when the switch in the active system is connected to the external communication apparatus in wireless access, the switch in the above active system, when detecting the communication timeout with the above controller, performs the stopping of the signal transmission, and performs the link-down of the port which is used for the connection to the above external communication apparatus.

REMARKS

In the above, some exemplary embodiments of the present invention have been described in detail. However, actually, the present invention is not limited to the above-explained exemplary embodiments, and even in the case of applying modifications in the range without departing from the spirit of the present invention, it is included in the present invention.

Note that, this application claims a priority based on Japanese Patent Application No. 2011-120115, and the disclosure thereof is hereby incorporated into the present application by this reference.

The invention claimed is:

1. An external control apparatus that controls a plurality of switch apparatuses, wherein the external control apparatus comprises:
a memory storing a flow instruction including a flow entry, wherein the flow entry includes a matching rule and an action to process a packet; and
a processor configured to execute program instructions to:
detect a failure of a control connection between the external control apparatus and a first switch apparatus of the plurality of switch apparatuses, wherein the first switch apparatus is configured to receive a packet from a node and detect the failure of the control connection independently from the external control apparatus;
control the first switch apparatus via the control connection;

calculate, when the failure of the control connection is detected, a flow path for the packet that does not include the first switch apparatus;

identify, based on the flow path, the flow instruction including the flow entry, wherein the first switch apparatus is configured to update the flow entry based on the detection of the failure of the control connection; and send the flow instruction including the flow entry to a second switch apparatus of the plurality of switch apparatuses to switch a route of the second switch apparatus.

2. The external control apparatus according to claim 1, wherein the processor is further configured to execute the program instructions to detect a timeout as the failure.

3. The external control apparatus according to claim 1, wherein the processor is further configured to execute the program instructions to send, before the failure is detected, to the first switch apparatus, an emergency instruction for processing the received packet when the failure is detected.

4. The external control apparatus according to claim 3, wherein the emergency instruction includes a link-down instruction for cutting off a communication link of a port.

5. The external control apparatus according to claim 3, wherein the emergency instruction includes a delete instruction for deleting the flow entry corresponding to forwarding the received packet to the communication link which has the failure.

6. The external control apparatus according to claim 1, wherein the first switch apparatus is connected to a third switch apparatus through a first link, the second switch apparatus is connected to the third switch apparatus through a second link, and the first link and the second link are aggregated as a virtual link.

7. A communication network system, comprising:
a first switch apparatus;
a second switch apparatus; and
an external control apparatus configured to control the first switch apparatus and the second switch apparatus via a control connection,
wherein the external control apparatus comprises:
a memory storing a flow instruction including a flow entry, wherein the flow entry includes a matching rule and an action to process a packet; and
a processor configured to execute program instructions to:
detect a failure of the control connection between the external control apparatus and the first switch apparatus, wherein the first switch apparatus is configured to receive a packet from a node and detect the failure of the control connection independently from the external control apparatus;
calculate, when the failure of the control connection is detected, a flow path for the packet that does not include the first switch apparatus;
identify, based on the flow path, the flow instruction including the flow entry, wherein the first switch apparatus is configured to update the flow entry based on the detection of the failure of the control connection; and
send the flow instruction including the flow entry to the second switch apparatus to switch a route of the second switch apparatus.

8. The communication network system according to claim 7, wherein the processor is further configured to execute the program instructions to detect a timeout as the failure.

9. The communication network system according to claim 7, wherein the processor is further configured to execute the program instructions to send, before the failure is detected, to the first switch apparatus, an emergency instruction for processing the received packet when the failure is detected.

10. The communication network system according to claim 9, wherein the emergency instruction includes a link-down instruction for cutting off a communication link of a port.

11. The communication network system according to claim 9, wherein the emergency instruction includes a delete instruction for deleting the flow entry corresponding to forwarding the received packet to the communication link which has the failure.

12. The communication network system according to claim 7, wherein the first switch apparatus is connected to a third switch apparatus through a first link, the second switch apparatus is connected to the third switch apparatus through a second link, and the first link and the second link are aggregated as a virtual link.

13. A communication control method performed by an external control apparatus, comprising:
detecting a failure of a control connection between the external control apparatus and a first switch apparatus, wherein the first switch apparatus is configured to receive a packet from a node and detect the failure of the control connection independently from the external control apparatus;
controlling the first switch apparatus via the control connection;
calculating, when the failure of the control connection is detected, a flow path for the packet that does not include the first switch apparatus;
identifying, based on the flow path, a flow instruction including a flow entry, wherein the flow entry includes a matching rule and an action to process the packet, wherein the first switch apparatus is configured to update the flow entry based on the detection of the failure of the control connection; and
sending the flow instruction including the flow entry to a second switch apparatus, in order to switch a route of the second switch apparatus.

14. The communication control method according to claim 13, further comprising detecting a timeout as the failure.

15. The communication control method according to claim 13, further comprising sending, before the failure is detected, to the first switch apparatus, an emergency instruction for processing the received packet when the failure is detected.

16. The communication control method according to claim 15, wherein the emergency instruction includes a link-down instruction for cutting off the communication link of a port.

17. The communication control method according to claim 15, wherein the emergency instruction includes a delete instruction for deleting the flow entry corresponding to forwarding the received packet to the communication link which has the failure.

18. The communication control method according to claim 13, wherein the first switch apparatus is connected to a third switch apparatus through a first link, the second switch apparatus is connected to the third switch apparatus through a second link, and the first link and the second link are aggregated as a virtual link.

* * * * *